US012326038B1

(12) United States Patent
Flannery et al.

(10) Patent No.: US 12,326,038 B1
(45) Date of Patent: Jun. 10, 2025

(54) GATED BARRIER WITH THRESHOLD ISOLATOR HAVING COMPRESSIBLE LAYER

(71) Applicant: Regalo International, LLC, Burnsville, MN (US)

(72) Inventors: Mark A. Flannery, Longboat Key, FL (US); Timothy C. Daggy, Shakopee, MN (US)

(73) Assignee: Regalo International, LLC, Longboat Key, FL (US)

( * ) Notice: Subject to any disclaimer, the term of this patent is extended or adjusted under 35 U.S.C. 154(b) by 0 days.

(21) Appl. No.: 18/244,250

(22) Filed: Sep. 9, 2023

Related U.S. Application Data

(63) Continuation of application No. 16/857,140, filed on Apr. 23, 2020, now Pat. No. 11,753,864.

(60) Provisional application No. 62/841,796, filed on May 1, 2019.

(51) Int. Cl.
*E06B 9/04* (2006.01)
*E06B 9/00* (2006.01)

(52) U.S. Cl.
CPC .......... *E06B 9/04* (2013.01); *E06B 2009/002* (2013.01)

(58) Field of Classification Search
CPC ..... E06B 9/02; E06B 9/04; E06B 7/32; E06B 2009/002
See application file for complete search history.

(56) References Cited

U.S. PATENT DOCUMENTS

| | | | | |
|---|---|---|---|---|
| 2,910,763 | A | 11/1959 | Lauterbach | |
| 4,031,283 | A | 6/1977 | Fagan | |
| 4,677,791 | A | 7/1987 | Larson | |
| 4,685,247 | A * | 8/1987 | Alam | E06B 9/04 49/55 |
| 4,984,619 | A | 1/1991 | Ellis | |
| 5,160,773 | A | 11/1992 | Sassa | |
| 5,367,829 | A | 11/1994 | Crossley | |
| 5,924,242 | A | 7/1999 | Macari | |
| 6,626,405 | B1 | 9/2003 | Keast | |
| 7,887,029 | B2 | 2/2011 | Flannery | |
| 7,950,184 | B2 | 5/2011 | Flannery | |
| 7,975,431 | B2 | 7/2011 | Flannery | |
| 8,196,348 | B2 | 6/2012 | Flannery | |
| 8,261,490 | B2 | 9/2012 | Flannery et al. | |
| 8,448,381 | B2 | 5/2013 | Flannery | |
| 8,607,502 | B2 | 12/2013 | Flannery et al. | |
| 8,713,851 | B2 | 5/2014 | Flannery et al. | |
| 8,720,958 | B2 | 5/2014 | Flannery et al. | |
| 8,844,158 | B2 | 9/2014 | Dehn | |
| 9,127,496 | B1 | 9/2015 | Flannery et al. | |
| 9,260,910 | B1 | 2/2016 | Flannery et al. | |
| 9,382,750 | B1 | 7/2016 | Flannery et al. | |
| 9,388,603 | B2 | 7/2016 | Flannery et al. | |
| 9,689,197 | B1 | 6/2017 | Flannery et al. | |
| 9,874,055 | B1 | 1/2018 | Flannery et al. | |
| 10,689,902 | B1 * | 6/2020 | Flannery | E06B 11/04 |

(Continued)

*Primary Examiner* — Justin B Rephann

(57) ABSTRACT

The present gated barrier includes a threshold and an isolator on the bottommost surface of the threshold to space the gated barrier from the floor. The isolator includes a compressible layer made of a textile. In a second embodiment, the isolator includes a relatively compressible layer made of a textile and a relatively incompressible layer made of a plastic. The isolator protects the floor against scratches and dampens the noise that is made when the gate is shut.

1 Claim, 5 Drawing Sheets

(56) References Cited

U.S. PATENT DOCUMENTS

| | | | |
|---|---|---|---|
| 2002/0182369 | A1 | 12/2002 | Hanes |
| 2005/0084646 | A1 | 4/2005 | Edwards |
| 2008/0280102 | A1 | 11/2008 | Brouard |
| 2012/0006498 | A1 | 1/2012 | Potter |
| 2012/0047688 | A1 | 3/2012 | Belec |
| 2012/0233922 | A1 | 9/2012 | Flannery |
| 2013/0117965 | A1 | 5/2013 | Sievers |
| 2013/0160365 | A1 | 6/2013 | Flannery |
| 2015/0075079 | A1 | 3/2015 | Sundberg |
| 2017/0306693 | A1 | 10/2017 | Potter |

* cited by examiner

GATED BARRIER WITH THRESHOLD ISOLATOR HAVING COMPRESSIBLE LAYER

This application is a continuation of U.S. patent application Ser. No. 16/857,140 filed Apr. 23, 2020 (U.S. Pat. No. 11,753,864 issued Sep. 12, 2023) and claims the benefit thereof under 35 U.S.C. § 120, which application claims the benefit under 35 U.S.C. 119 (e) of U.S. Provisional Patent Application No. 62/841,796 filed May 1, 2019, all of which applications are hereby incorporated by reference in their entireties herein.

FIELD OF THE INVENTION

The present invention relates to a gated barrier in a residential home, particularly to the threshold of the gated barrier, and specifically to an isolator engaged on the bottommost surface of the gated barrier or the bottommost surface of the threshold of the gated barrier.

BACKGROUND OF THE INVENTION

A barrier or gate may be placed in a home to keep pets or children in or out of certain areas in the home. The gates may rest upon or be slightly spaced above floors that are susceptible to being scratched, such as hardwood floors. Or the gates may rest upon or be slightly spaced above floors through which sound is easily transmitted, such as hardwood floors, tile floors, or stone floors.

Unrecognized by the industry, barriers move relative to the floor. Even if ever so slightly, barriers move. The gate in the barrier swings open and shut. Adults may step upon the threshold. Feet bump upon the front face or back face of the threshold. Children and pets press against gated barriers. Such forces are transmitted from the gate to the frame about the gate, which frame includes the threshold or other bottommost portions of the gate. The transmitted force or motion to the frame moves or slides the bottommost portions of the gated barrier across the floor, if ever so slightly. This transmitted motion may occur little by little over a relatively long period of time such that, when the gated barrier is removed, scratches are noticed for the first time on the floor surface from which the threshold or bottommost portion of the barrier had been removed.

SUMMARY OF THE INVENTION

A feature of the present invention is a gated barrier in a residential home.

Another feature of the present invention is the provision in a gated barrier, of the gated barrier being on or adjacent to a floor in the residential home.

Another feature of the present invention is the provision in a gated barrier, of the gated barrier engaging two spaced apart vertical surfaces while the gated barrier is on or adjacent to the floor.

Another feature of the present invention is the provision in a gated barrier, of the gated barrier having a predefined weight or having a given weight.

Another feature of the present invention is the provision in a gated barrier, of a barrier frame, where the barrier frame is generally U-shaped, where the barrier frame includes an open top, where the barrier frame includes first and second standards and a threshold between the first and second standards, and where the threshold opposes the open top of the barrier frame.

Another feature of the present invention is the provision in a gated barrier, of a gate engaged to the barrier frame between the standards and above the threshold, where the gate is swingable.

Another feature of the present invention is the provision in a gated barrier, of the threshold having a bottommost surface, of an isolator engaged to the bottommost surface of the threshold to space the bottommost surface of the threshold from the floor, and of the isolator being compressible under the weight of the gated barrier.

Another feature of the present invention is the provision in a gated barrier, of the isolator including a bottommost surface, where the bottommost surface of the isolator includes a textile.

Another feature of the present invention is the provision in a gated barrier, of the isolator including a bottommost surface, where the bottommost surface of the isolator includes a matted textile.

Another feature of the present invention is the provision in a gated barrier, of the isolator including a bottommost surface, where the bottommost surface of the isolator includes a felt material.

Another feature of the present invention is the provision in a gated barrier, of the felt material including a fiber mat.

Another feature of the present invention is the provision in a gated barrier, of the threshold including a first end portion that extends outwardly beyond the first standard, where the isolator is engaged to the bottommost surface of at least a portion of the first end portion of the threshold.

Another feature of the present invention is the provision in a gated barrier, of the threshold including a second end portion that extends outwardly beyond the second standard, where another isolator is engaged to the bottommost surface of at least a portion of the second end portion of the threshold.

Another feature of the present invention is the provision in a gated barrier, of the threshold including a first end portion that extends outwardly beyond the first standard, where the threshold includes a second end portion that extends outwardly beyond the second standard, and where the threshold includes an intermediate portion between the first and second end portions, where the isolator includes first, second, and third isolator portions, with the first isolator portion engaged to the bottommost surface of at least a portion of the first end portion, with the second isolator portion engaged to the bottommost surface of at least a portion of the second end portion, and with the third isolator portion engaged to the bottommost surface of the intermediate portion.

Another feature of the present invention is the provision in a gated barrier, of the threshold including a first threshold portion and a second threshold portion having respective first and second inner end portions that are adjacent to each other, where the isolator extends from the first inner end portion of the first threshold portion to the second inner end portion of the second threshold portion.

Another feature of the present invention is the provision in a gated barrier, of the isolator including an uppermost portion having an adhesive layer and a lowermost portion having a textile, where the lowermost portion is compressible under the weight of the gated barrier.

Another feature of the present invention is the provision in a gated barrier, of the isolator including an uppermost portion having an adhesive layer and a lowermost portion having a matted textile, where the lowermost portion is compressible under the weight of the gated barrier.

Another feature of the present invention is the provision in a gated barrier, of the isolator including uppermost, intermediate, and lowermost portions, where the uppermost portion includes an adhesive layer, where the lowermost portion includes a textile, and where the intermediate portion is disposed between the uppermost and lowermost portions, where the intermediate portion is incompressible under the weight of the gated barrier, and where the lowermost portion is compressible under the weight of the gated barrier.

Another feature of the present invention is the provision in a gated barrier, of the isolator including uppermost, intermediate, and lowermost portions, where the uppermost portion includes an adhesive layer, where the lowermost portion includes a textile, and where the intermediate portion is disposed between the uppermost and lowermost portions, and where the lowermost portion is compressible to a greater degree under the weight of the gated barrier than is the intermediate portion.

Another feature of the present invention is the provision in a gated barrier, of first and second hand wheel apparatus engaged to a first end of the frame having the first standard, of third and fourth hand wheel apparatus engaged to a second end of the frame having the second standard, where the first, second, third, and fourth hand wheel apparatus fix the gated barrier between two opposing vertical surfaces and to one location that is on or adjacent to the floor, where the threshold isolators engage the floor.

Another feature of the present invention is the provision in a gated barrier, of the isolator including a bottommost surface, and of the bottommost surface of the isolator including a non-woven unbonded fibrous structure deriving coherence and strength from interfiber entanglement and accompanying frictional forces.

Another feature of the present invention is the provision in a gated barrier, of the isolator including a bottommost surface, and of the bottommost surface of the isolator including felt or a felt-like product.

Another feature of the present invention is the provision in an object, of the object being engaged between first and second vertical surfaces and that is further positively isolated from a floor extending between the first and second vertical surfaces.

Another feature of the present invention is the provision in such an object, of the object including a frame, first and second arms extending from the frame to the first vertical surface, third and fourth arms extending from the frame to the second vertical surface, a gate in the frame where the gate is swingable, a threshold engaged to the frame below the gate where the threshold includes a bottommost surface, and an isolator engaged to the bottommost surface of the threshold to space the bottommost surface of the threshold from the floor where the isolator is compressible under the weight of the object.

An advantage of the present invention is that floor scratches are minimized from an object that ostensibly does not move, but in fact moves ever so slightly and little by little over a relatively long period of time.

Another advantage of the present invention is that noise from the opening and shutting of a gate in a gated barrier is dampened by isolating the threshold from the floor.

Another advantage of the present invention is minimizing the amount of contact between bottommost portions of a gated barrier and scratchable surfaces of the floor so as, for example, to minimize contact between metal surfaces of the gated barrier and hardwood floors.

Another advantage of the present invention is outright eliminating any contact between bottommost portions of a gated barrier and scratchable surfaces of the floor so as, for example, to eliminate all contact between metal surfaces of the gated barrier and hardwood floors.

DESCRIPTION

Figure 1:
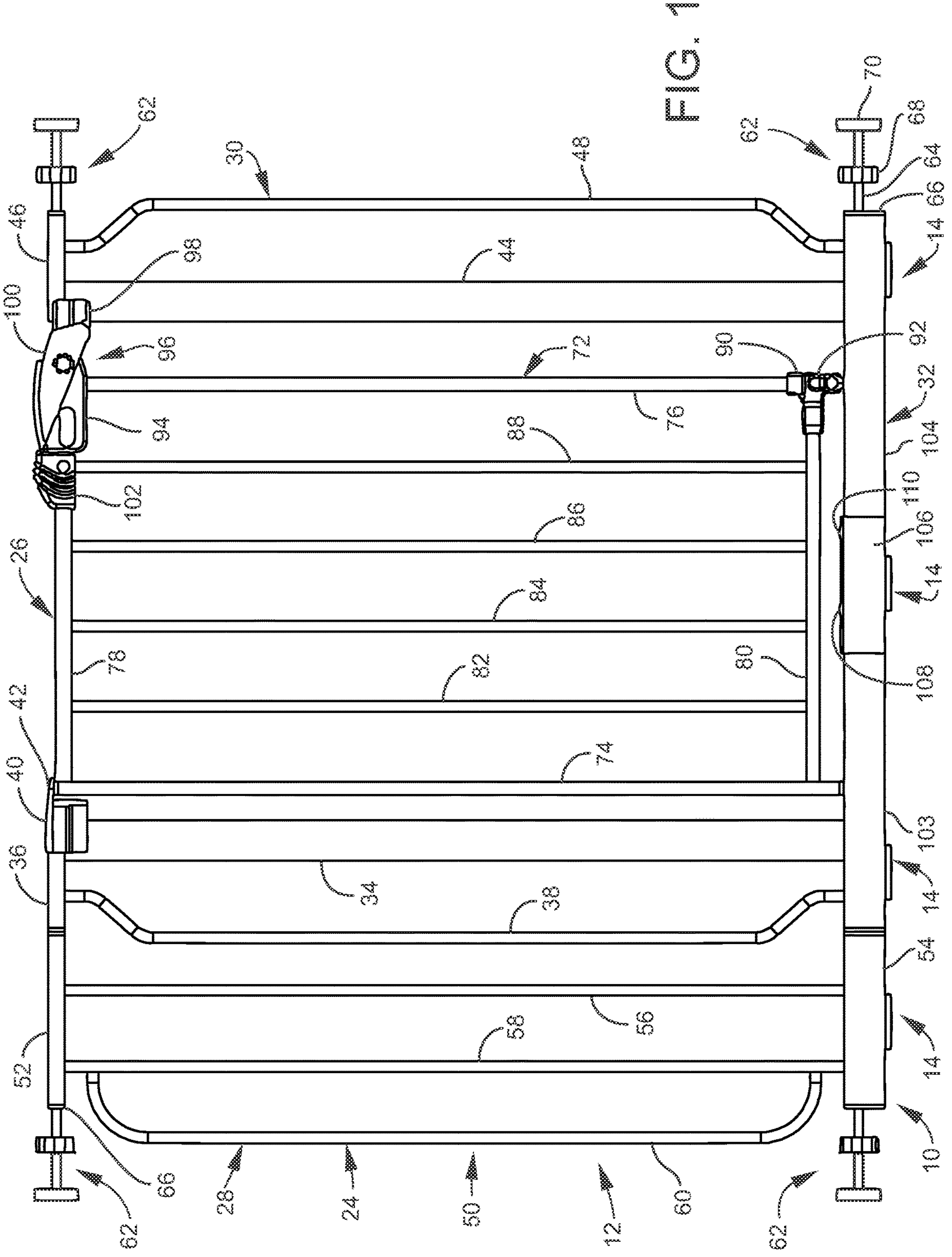
FIG. 1 is an elevation view of the present gated barrier and threshold isolator combination.
Figure 2:
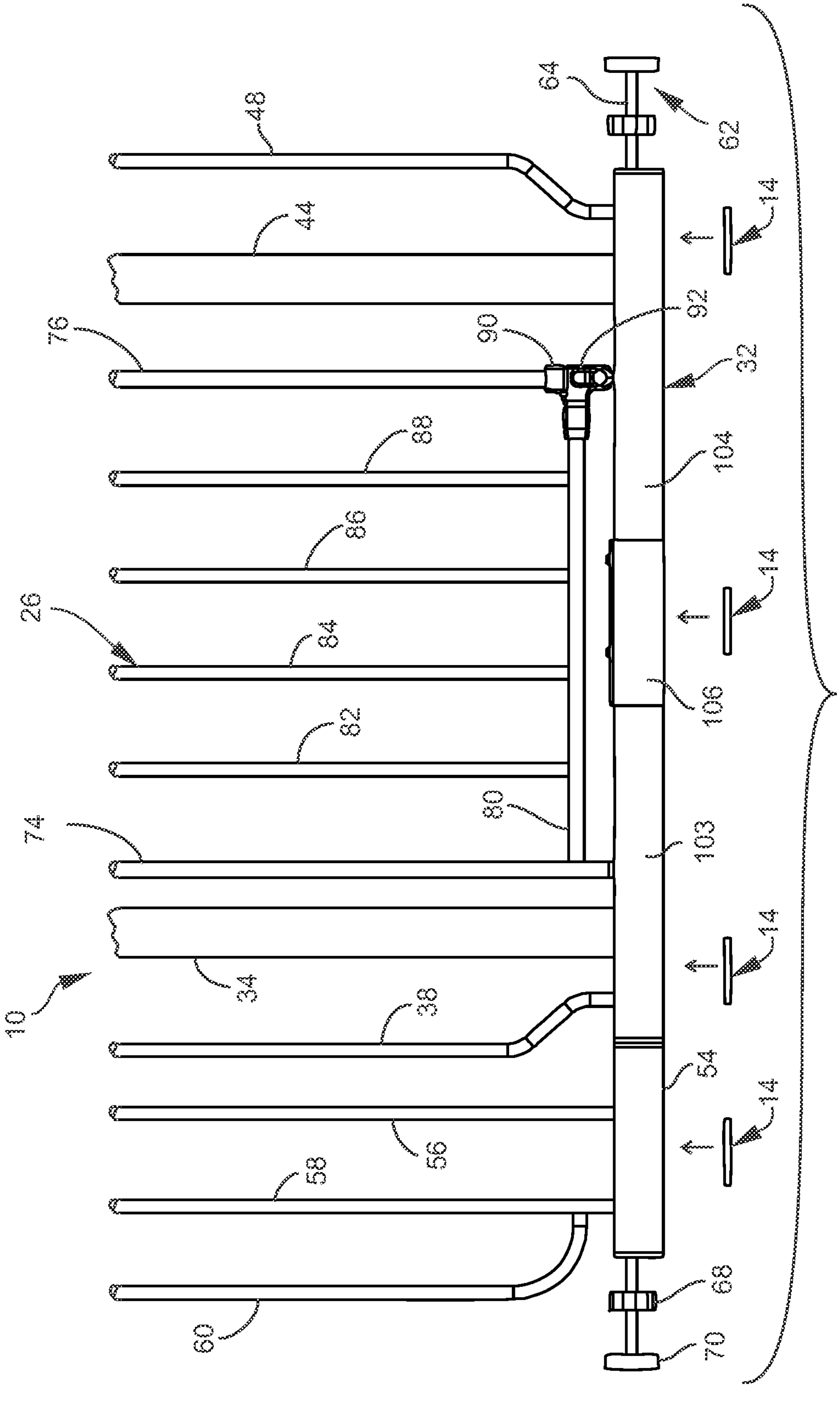
FIG. 2 is an elevation exploded view of a portion of the gated barrier and threshold isolator combination of FIG. 1.
Figure 4B:
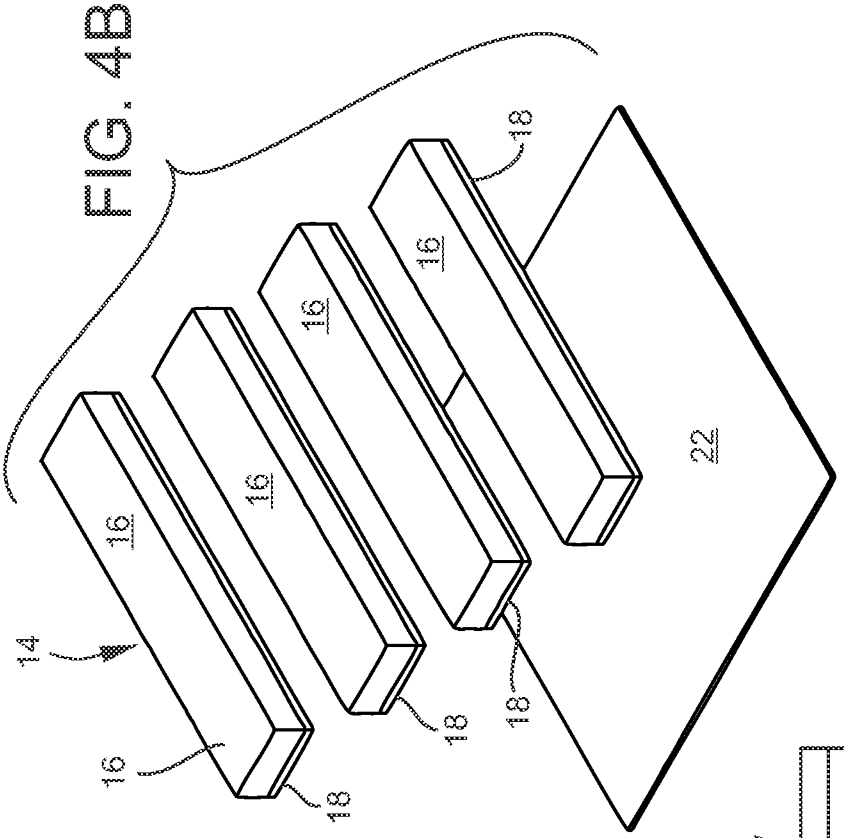
FIG. 4B is an exploded view of the present two layer gated barrier threshold isolator of FIG. 4A with the release backing sheet or liner, all in an upside down position.
Figure 4A:
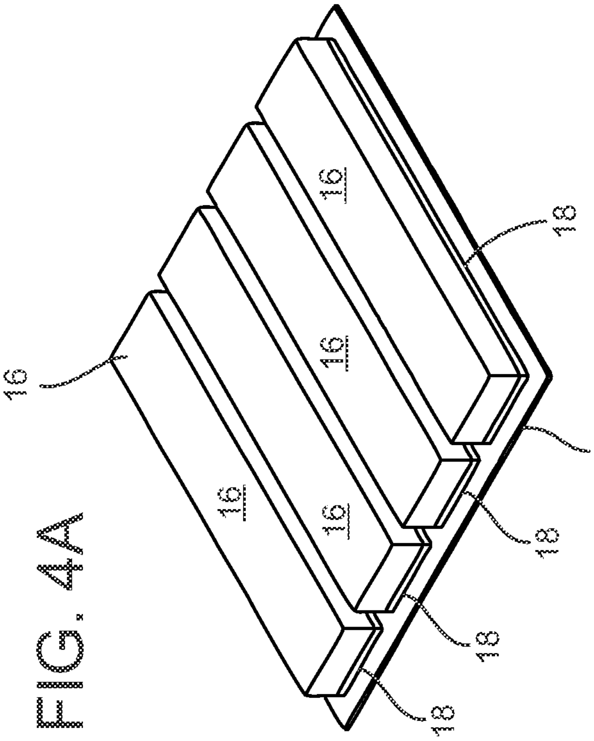
FIG. 4A is a perspective view of the present two layer gated barrier threshold isolator on a release backing sheet or liner, all in an upside down position.
Figure 4C:
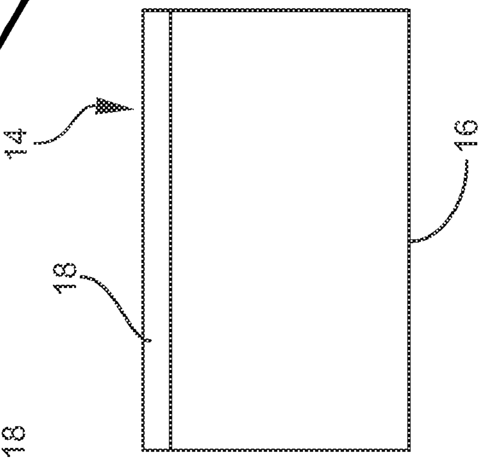
FIG. 4C is an end view of the present two layer gated barrier threshold isolator of FIG. 4A in the right side up position without the release backing sheet or liner, which right side up position is the position in which the two layer gated barrier threshold isolator is employed.

As shown in FIGS. 1 and 4C, the present gated barrier and threshold isolator combination 10 includes a gated barrier 12 and a two layer threshold isolator 14. As shown in FIG. 4C the two layer threshold isolator 14 includes a compressible lower layer 16 that is compressible under the weight of the gated barrier 12 and an adhesive upper layer 18. A release backing sheet or liner 22 is shown in FIGS. 4A and 4B.

Gated barrier 12 includes a frame 24 and a gate 26. Frame 24 is an open top U-shaped frame. Frame 24 includes a first end 28, a second end 30, and a threshold 32 engaged between the first and second ends 28, 30. First end 28 includes a vertical first standard 34 engaged between the threshold 32 and an upper horizontal support member 36 that runs parallel to the threshold 32. First standard 34 is set at a right angle relative to the threshold 32 and horizontal support member 36. First end 28 further includes a generally U-shaped vertical support member 38 extending from the threshold 32 to the horizontal support member 36. First end 28 further includes a plastic piece 40 that is engaged to one or more of the first standard 34 and horizontal support member 36. Plastic piece 40 extends inwardly from the upper portion of the first standard 34 and inwardly from the inner portion of the horizontal support member 36. Plastic piece 40 includes a cantilevered or projecting portion 42 that pivotally engages gate 26.

Second end 30 includes a vertical second standard 44 engaged between the threshold 32 and an upper horizontal support member 46 that runs parallel to the threshold 32. Second standard 44 is set at a right angle relative to the threshold 32 and upper horizontal support member 46. Second end 30 further includes a generally U-shaped vertical support member 48 extending from the threshold 32 to the upper horizontal support member 46.

First and second standards 34, 44 are tubular and are rectangular in section, where "rectangular" means having adjacent sides that are unequal in length. Threshold 32 is tubular. Threshold 32 is preferably square in section. Upper horizontal support members 36, 46 are tubular. Upper horizontal support members 36, 46 are preferably square in section. U-shaped support members 38, 48 may be tubular or solid in section, in which, if the latter case, the U-shaped support members 38, 48 may be described as rods.

First end 28 and second end frame 30 may include a frame extension 50. Frame extension 50 includes an upper horizontal support member 52, a lower horizontal support member 54 or threshold extension 54, and one or more vertical support members 56, 58 engaged between the upper and lower horizontal support members 52, 54. Vertical support member 58 includes a U-shaped support member 60. Vertical support members 56, 58 are preferably tubular. U-shaped support member 60 may be tubular or solid in section, in which, if the latter case, the U-shaped support member 60 may be described as a rod.

Upper horizontal support member 52 may engage the upper horizontal support member 36 through a male/female connection where one support member includes a male end and where the other support member includes a female end.

Threshold extension 54 may engage the threshold 32 through a male/female connection where one of the threshold extension 54 and threshold 32 includes a male end and where the other of the threshold extension 54 and threshold 32 includes a female end.

The outer ends of horizontal support members 36, 46, and 52 may engage hand wheel apparatus 62. The outer ends of threshold 32 may engage hand wheel apparatus 62. The outer end of threshold extension 54 may engage hand wheel apparatus 62. Hand wheel apparatus 62 includes a threaded rod 64 that slides into and out of the outer ends of one of the upper horizontal member 36, upper horizontal member 46, upper horizontal member 52, threshold 32, and threshold extension 54. Sliding threaded rod 64 is supported by the circular edges of a hole formed in an insert 66 engaged in such outer end of upper horizontal member 36, upper horizontal member 46, upper horizontal member 52, threshold 32, or threshold extension 54. Hand wheel apparatus 62 further includes a hand wheel 68 threadingly engaged on threaded rod 64 and a wall disk 70 pivotally but not threadingly engaged on the distal end of threaded rod 64. The inner face of hand wheel 68 brings pressure upon the insert 66 of such outer end or upon the outer end itself of the upper horizontal member 36, upper horizontal member 46, upper horizontal member 52, threshold 32, or threshold extension 54 when the hand wheel 68 is rotated in one direction. When the hand wheel 68 is rotated in such one direction, the effective length of the portion of the threaded rod 64 between the hand wheel 68 and wall disk 70 is extended such that the outer surface of the wall disk 70 brings relative pressure upon a vertical surface such as a wall or door jamb such that the gated barrier 12 can be fixed between two spaced apart vertical surfaces such as two spaced apart door jambs. Rotation of the hand wheel 68 lessens such effective distance of the portion between the hand wheel 68 and wall disk 70 such that the gated barrier 12 can be removed from between such two spaced apart vertical surfaces such as two spaced apart door jambs. When fixed between two such spaced apart vertical surfaces by the hand wheel apparatus 62, which may be referred to as first, second, third, and fourth hand wheel apparatus 62 or first, second, third, and fourth arms 62, the gated barrier 12 may rest upon the floor or be spaced apart from the floor. The present two layer threshold isolator 14 or three layer threshold isolator 14' may be employed whether the gated barrier 12 rests upon the floor or is spaced from the floor.

Gate 26 includes a frame 72 that includes a first end vertical support member 74, a second end vertical support member 76, an upper horizontal support member 78, a lower horizontal support member 80, and a set of four interior vertical support members 82, 84, 86, and 88. First end vertical support member 74 is engaged to upper and lower horizontal support members 78, 80 at right angles. Second end vertical support member 76 is engaged to upper and lower horizontal support members 78, 80 at right angles. Interior vertical support members 82, 84, 86, 88 are engaged to upper and lower horizontal support members 78, 80 at right angles. First and second vertical support members 74, 76 are tubular. Upper and lower horizontal support members 78, 80 are tubular. Interior support members 82, 84, 86, 88 are tubular. Second end vertical support member 76 and lower horizontal support member 80 may be directly engaged to each other or may be engaged to each other by a corner plastic piece 90 having front and rear swing down arms 92 that engage front and rear faces of threshold 32 to as to prevent swinging of the gate 26 to both sides or to one side in the case that only one of the swing down arms 92 has been turned down. Upper horizontal support member 78 and second end vertical support member 72 may be engaged to each other by a housing 94 of latch apparatus 96 or may be engaged to each other directly. Latch apparatus 96 includes a U-shaped latch 98 that engages front and rear faces of an upper end of second standard 44. U-shaped latch 98 is retracted and extended by a first end of a pivoting arm 100 that is pivotally engaged to housing 94. A second end of the pivoting arm 100 may be captured or locked by a sliding piece 102 or sliding lock 102 slidingly engaged with upper horizontal support member 78. Sliding the lock 102 away from housing 94 releases the second end of pivoting arm 100 so as to permit the second end of the pivoting arm 100 to pivot upwardly so as to pivot the first end of pivoting arm 100 downwardly so as to retract the U-shaped latch 98 away from second standard 44 to as to permit the gate 26 to be swung open, provided one or more of the swing down arms 92 have been swung upwardly and away from its respective front or rear threshold face.

Gated barrier 12 is a pressure gate or pressure gated barrier 12. That is, one or more of standards 34, 44 is manufactured to be oblique relative to threshold 32. Then, when put into use, i.e., when one or more of hand wheel apparatus 62 are operated, one or more of standards 34, 44 are pushed by the hand wheel apparatus 62 into a right angle relationship with threshold 32 so as to push the upper end of the second standard 44 into a position to be engaged by U-shaped latch 98 such that, when the gated barrier 12 is engaged between two vertical surfaces, such as between two door jambs, the generally U-shaped frame 24 of the gated barrier 12 is under pressure and better maintains its position between the two vertical surfaces, such as between two door jambs. Gate 26 swings about an axis that is defined by first end vertical support member 74 that is pivotally engaged at a bottom end to threshold 32 and that is pivotally engaged at a top end to cantilevered portion 42 of plastic piece 40.

Figures 3A, 3B, 3C, 3D:
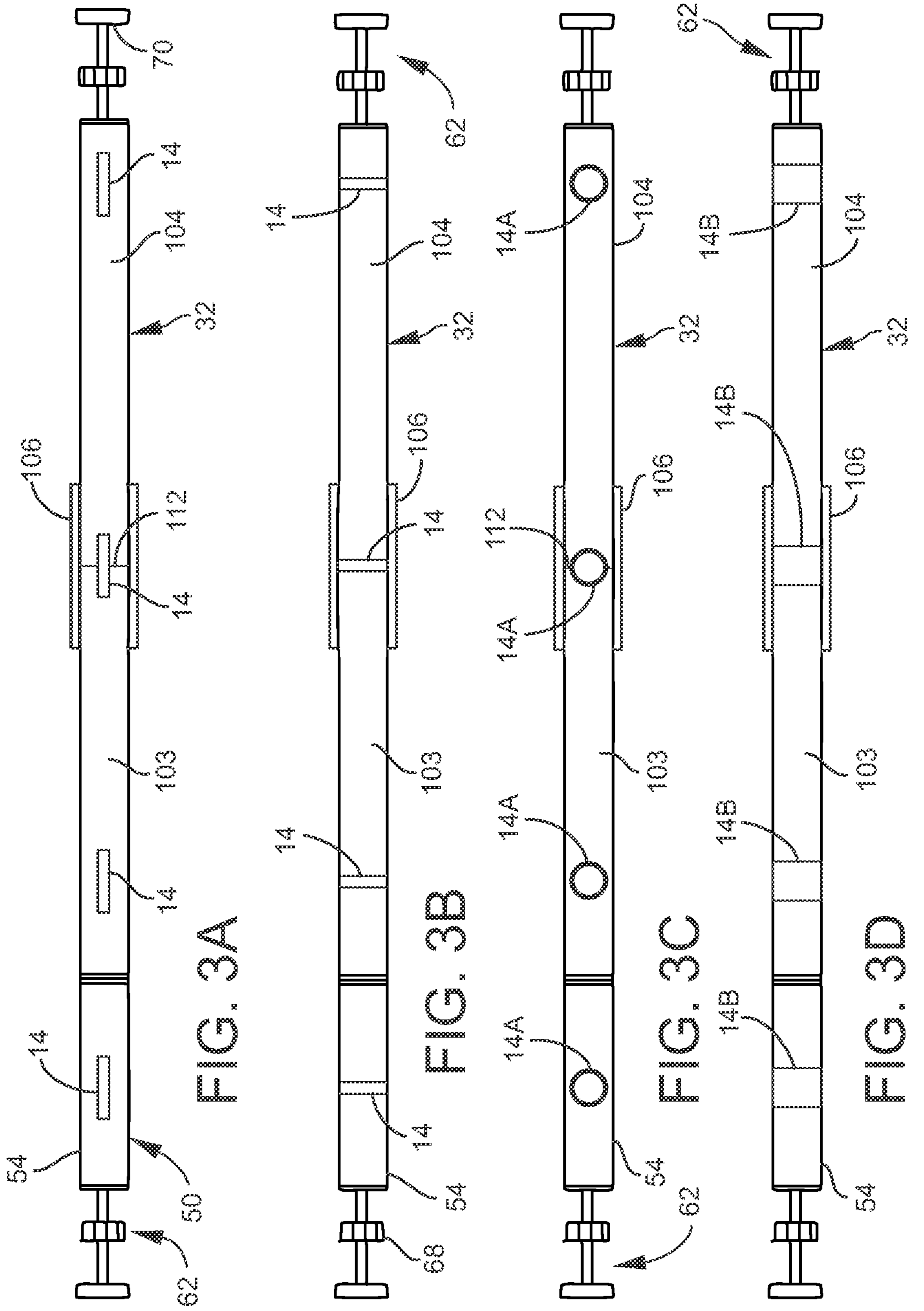
FIG. 3A is a bottom view of the gated barrier and threshold isolator combination of FIG. 1.
FIG. 3B is a bottom view of a second embodiment of the gated barrier and threshold isolator combination of FIG. 1.
FIG. 3C is a bottom view of a third embodiment of the gated barrier and threshold isolator combination of FIG. 1.
FIG. 3D is a bottom view of a fourth embodiment of the gated barrier and threshold isolator combination of FIG. 1.

Threshold 32 is a two piece threshold. That is, threshold 32 includes a first threshold portion 103 and a second threshold portion 104 joined by an inverted U-shaped connector 106. Pin 108 engages the upper side of the inverted U-shaped connector 106 and the upper side of the first threshold portion 103. Pin 110 engages the upper side of the inverted U-shaped connector 106 and the upper side of the second threshold portion 104. The inner ends of first and second threshold portions 103, 104 are adjacent to each other, may or may not abut each other, and may or may not be spaced from each other. Each of the inner ends of the first and second threshold portions 103, 104 may have inserts or plugs placed at or in the inner ends, and such respective inserts or plugs, if present, are adjacent to each other, may or may not abut each other, and may or may not be spaced from each other. This junction 112 at or between the inner ends of threshold portions 103, 104 is shown in FIGS. 3A and 3C. If desired, one of the inner ends of the portions 103, 104 may be a female open end and the other of the inner ends of the portions 103, 104 may be a male end that is inserted into the female open end. In this latter case, junction 112 is still present. If the inner ends of the portions 103, 104 are slightly spaced apart, the junction 112 may be described as an adjacent relationship where the isolator 14, 14A, or 14B spans the junction 112 or adjacent relationship.

The compressible layer 16 of the two layer threshold isolator 14 or the three layer threshold isolator 14' is preferably a textile that is a damper, that has a relatively high density, that has springiness, compressibility, and resiliency, that is a silencer, that minimizes the transmission of sound waves, that is a sound damper, that is a vibration damper, that minimizes vibration between first and second objects when placed between and engaging the first and second objects, that is a cushion, that is a pad, that is a shock absorber, and that is a noise reducer. The compressible layer 16 is preferably flexible. The compressible layer 16 is preferably bendable. The compressible layer 16 preferably returns to its original shape without distortion when the weight of the gated barrier 12 is released. The compressible layer 16 is preferably resilient so as to be compressed under the weight of the gated barrier 12 and so as to spring back to an original uncompressed state when the weight of the gated barrier 12 is released.

The compressible layer 16 preferably is felt or preferably includes felt. Felt is a damper. Felt has a relatively high density. Felt has springiness, compressibility, and resiliency. Felt is a damper. Felt is a silencer. Felt minimizes the transmission of sound waves. Felt is a sound damper. Felt is a vibration damper. Felt minimizes vibration between first and second objects when placed between and engaging the first and second objects. Felt is a cushion and pad. Felt is a shock absorber. Felt is a noise reducer. Felt is flexible. Felt is bendable. Felt returns to its original shape without distortion. Felt is resilient. The compressible layer 16 may be a woven felt or a pressed felt.

Felt or the compressible layer 16 may be defined as a kind of cloth made by rolling and pressing wool or another suitable textile accompanied by the application of moisture or heat, which causes the constituent fibers to mat together to create a smooth surface. Felt or the compressible layer 16 may be defined as a textile material that is produced by matting, condensing and pressing fibers together. Felt or the compressible layer 16 can be made of natural fibers such as wool or animal fur, or from synthetic fibers such as petroleum-based acrylic or acrylonitrile or wood pulp-based rayon. Felt or compressible layer 16 may be made with blended fibers.

If desired, the compressible layer 16 may be formed of polyester fabric, polypropylene fabric, Teflon®, Teflon® fabric, nylon fabric, acetal fabric, Nomex®, Nomex® fabric, flock fabric, velvet fabric, pile fabric, or plush fabric. If desired, the compressible layer 16 may be made of a compressible plastic or compressible polymer, such as an open cell foam or closed cell foam.

Opposing and engaging the compressible layer 16 is an adhesive layer 18. Adhesive layer 18 is an adhesive that adheres to metal (of metal gates), or wood (of wood gates), or wood products (of gates made from wood products), or plastic (of plastic gates). Gated barrier 12, including threshold 32, may be formed of metal, wood, a wood product, or plastic. Adhesive layer 18 may include an adhesive that adheres to textiles and matted textiles, including felt.

Adhesive layer 18 may be engaged to the compressible layer 16 by adhesion or a heat treatment where the adhesive layer 18 and compressible layer 16 are fused together. The adhesive layer 18 may include a paper sub-layer or a plastic sub-layer or a wood sub-layer or some other substrate sub-layer such that the adhesive is on one surface or impregnated into such one surface of the paper, plastic, wood, or substrate sub-layer and, in turn, the opposing surface of the paper, plastic, wood, or substrate sub-layer is bonded, fused, or otherwise engaged to the compressible layer 16. Adhesive layer 18 may be relatively hard with a sticky adhesive surface. Adhesive layer 18 may be sticky and incompressible under the weight of the gated barrier 12. The substrate sub-layer may be incompressible under the weight of the gated barrier 12.

Release or liner 22 may be a paper or plastic release or liner 22.

FIG. 3A shows a set of rectangular shaped threshold isolators 14, where each of the isolators 14 includes the compressible layer 16 and the adhesive layer 18, where layers 16 and 18 are formed in the shape of a rectangle having adjacent sides of unequal length. Such threshold isolators 14 are shown in FIGS. 4A, 4B, and 4C.

FIG. 3B shows a set of rectangular shaped threshold isolators 14, where each of the isolators 14 includes the compressible layer 16 and the adhesive layer 18, where layers 16 and 18 are formed in the shape of a rectangle having adjacent sides of unequal length. Such threshold isolators 14 are shown in FIGS. 4A, 4B, and 4C.

FIG. 3C shows a set of disk shaped threshold isolators 14A, where each of the isolators 14A includes the compressible layer 16 and the adhesive layer 18, where layers 16 and 18 are formed in the shaped of a disk.

FIG. 3D shows a set of parallelepiped threshold isolators 14B, where each of the isolators 14B includes the compressible layer 16 and the adhesive layer 18, where layers 16 and 18 are parallelepiped.

FIG. 3A shows each of the four threshold isolators 14 placed parallel to the axis of the threshold 32 on the bottommost surface of the threshold 32 or threshold extension 54. One isolator 14 is engaged on the threshold portion 54 of the frame extension 50. One isolator 14 is placed on one end portion of the threshold 32 and is spaced from the absolute end of the threshold portion 103 to which the isolator 14 is adjacent. A portion of such isolator is directly under standard 34 and a portion of such isolator is on the threshold portion 103 that extends outwardly from standard 34. An intermediate isolator 14 is placed so as to traverse the junction 112 and engage each of threshold portions 103, 104. One isolator 14 is placed on one end portion of the threshold 32 and is spaced from the absolute end of the threshold portion 104 to which the isolator 14 is adjacent. A portion of such isolator is directly under standard 44 and a portion of such isolator is on the threshold portion 104 that extends outwardly from standard 44. When such isolators 14 are engaged, no bottom surface of the threshold 32 or threshold extension 54 engages the floor.

FIG. 3B shows each of the four threshold isolators 14 placed transversely of the axis of the threshold 32 on the bottommost surface of the threshold 32 or threshold extension 54. One isolator 14 is engaged on the threshold portion 54 of the frame extension 50. One isolator 14 is placed on one end portion of the threshold 32 and is spaced from the absolute end of the threshold portion 103 to which the isolator 14 is adjacent. An intermediate isolator 14 is placed so as to traverse the junction 112 and engage each of threshold portions 103, 104. One isolator 14 is placed on one end portion of the threshold 32 and is spaced from the absolute end of the threshold portion 104 to which the isolator 14 is adjacent. The ends of each of the isolators 14 are adjacent to, and may be flush with, the front and rear faces of the threshold 32 or the threshold portion 54. When such isolators 14 are engaged, no bottom surface of the threshold 32 or threshold extension 54 engages the floor.

FIG. 3C shows each of the four threshold isolators 14A placed on the bottommost surface of the threshold 32. One isolator 14A is engaged on the threshold portion 54 of the frame extension 50. One isolator 14A is placed on one end portion of the threshold 32 and is spaced from the absolute end of the threshold portion 103 to which the isolator 14A is adjacent. A portion of such isolator is directly under standard 34 and a portion of such isolator is on the threshold portion 103 that extends outwardly from standard 34. An intermediate isolator 14A is placed so as to traverse the junction 112 and engage each of threshold portions 103, 104. One isolator 14A is placed on one end portion of the threshold 32 and is spaced from the absolute end of the threshold portion 104 to which the isolator 14A is adjacent. A portion of such isolator is directly under standard 44 and a portion of such isolator is on the threshold portion 104 that extends outwardly from standard 44. When such isolators 14A are engaged, no bottom surface of the threshold 32 or threshold extension 54 engages the floor.

FIG. 3D shows each of the four threshold isolators 14B placed on the bottommost surface of the threshold 32. One isolator 14B is engaged on the threshold portion 54 of the frame extension 50. One isolator 14B is placed on one end portion of the threshold 32 and is spaced from the absolute end of the threshold portion 103 to which the isolator 14B is adjacent. A portion of such isolator is directly under standard 34 and a portion of such isolator is on the threshold portion 103 that extends outwardly from standard 34. An intermediate isolator 14B is placed so as to traverse the junction 112 and engage each of threshold portions 103, 104. One isolator 14B is placed on one end portion of the threshold 32 and is spaced from the absolute end of the threshold portion 104 to which the isolator 14B is adjacent. A portion of such isolator is directly under standard 44 and a portion of such isolator is on the threshold portion 104 that extends outwardly from standard 44. When such isolators 14B are engaged, no bottom surface of the threshold 32 or threshold extension 54 engages the floor.

It should be noted that the outer faces of wall disks 70 may have compressible layer 16 such that the compressible layer 16 is the material that makes contact with the vertical surfaces such as the vertical surfaces of two opposing door jambs. With all four wall disks 70 having compressible layer 16, and with the bottommost portion of the threshold 16 having the threshold isolators 14, the gated barrier 12 is isolated from hard surfaces of the house, thereby dampening and minimizing noise when the gate 26 is opened and shut.

In operation, the threshold isolators 14 on the release 22 are included in the shipping carton having the gated barrier 12 with the threshold 32. The threshold 32 preferably includes indicia or printed matter or graphics or inkings or lettering or illustration on the bottom or bottommost surface that indicate or communicate where the threshold isolators 14 are to be placed. The end user peels the threshold isolators 14 off the release 22 and places the threshold isolators 14 where indicated. Then the gated barrier 12 is engaged to opposing vertical surfaces using the first, second, third, and fourth hand wheel apparatus 62, with the threshold isolators 14 resting on the floor and thereby isolating the gated barrier 12 from the floor, with such isolation protecting the floor from scratches during set up, during a long period of use, and during take down of the gated barrier 12. If portions of the floor are uneven, the threshold isolators 14 may keep the bottommost surface of the threshold 32 above the higher uneven floor locations. The threshold isolators 14 dampen the noise of the gate 26 closing. The threshold isolators 14 protect the floor from being scratched when the gate 26 is closed because the gated barrier 12 as a whole moves, if ever so slightly, when the gate 26 is closed. The threshold isolators 14 protect the floor from being scratched when any part of the gated barrier 12 is bumped. The threshold isolator 14 or 14A or 14B that spans the junction 112 may protect the floor from being dug into or scratched in the case where one of the inner ends of one of the threshold portions 103, 104 is offset from the other inner end.

Figure 5B:
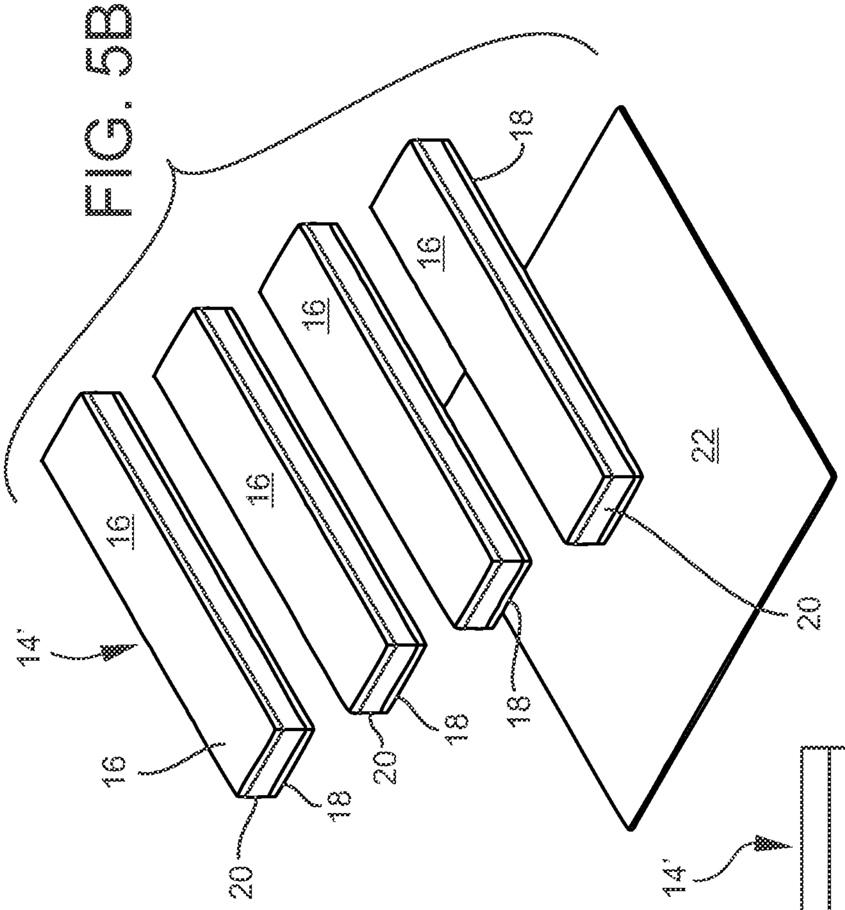
FIG. 5B is an exploded view of the present three layer gated barrier threshold isolator of FIG. 5A with the release backing sheet or liner, all in an upside down position.
Figure 5C:
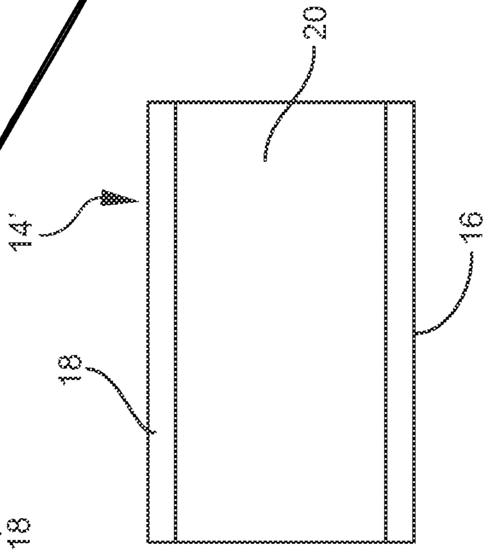
FIG. 5C is an end view of the present three layer gated barrier threshold isolator of FIG. 5A in the right side up position without the release backing sheet or liner, which right side up position is the position in which the three layer gated barrier threshold isolator is employed.
Figure 5A:
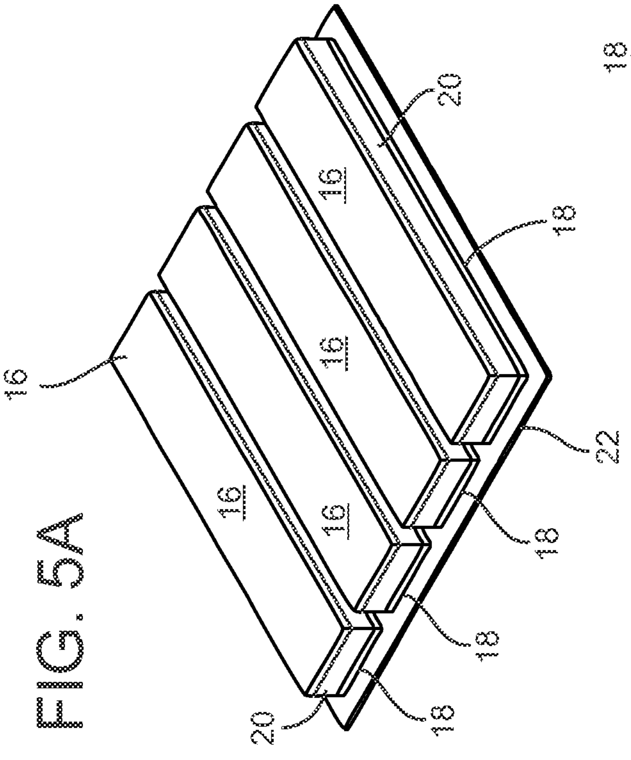
FIG. 5A is a perspective view of the present three layer gated barrier threshold isolator on a release backing sheet or liner, all in an upside down position.

In an alternate embodiment of the invention, as shown in FIGS. 5A, 5B, and 5C, the present gated barrier and threshold isolator combination 10 includes a gated barrier 12 and a three layer threshold isolator 14'. As shown in FIG. 5C, the three layer threshold isolator 14' includes the compressible lower layer 16 that is compressible under the weight of the gated barrier 12, the adhesive upper layer 18, and an incompressible intermediate layer 20 that is incompressible under the weight of the gated barrier 12. The release backing sheet or liner 22 is shown in FIGS. 5A and 5B.

The plastic intermediate layer 20 is incompressible under the weight of the gated barrier 12. The plastic intermediate layer 20 may be a polymer. The plastic intermediate layer 20 may include open cells, closed cells, or may not have either an open cell configuration or a closed cell configuration. The plastic intermediate layer 20 is incompressible under the weight of the gated barrier 12 such that, if the compressible layer 16 is torn off, the gated barrier 12 is still spaced from the floor by the plastic intermediate layer 20. The incompressible layer 20 may be engaged to the compressible layer 16 by an adhesive. Adhesive layer 18 is an adhesive that adheres to both the plastic incompressible layer 20 and to metal (of a metal gate), wood (of a wood gate), a wood product (of a gate made from a wood product), or plastic (of a plastic gate).

FIG. 1, FIG. 2, FIG. 3A, FIG. 3B, FIG. 3C, and FIG. 3D show locations for the two layer threshold isolators 14, 14A, and 14B. The three layer threshold isolators 14' may be placed at such locations instead of the two layer threshold isolators 14.

Felt is a textile fabric. Animal fibers such as wool and fur are feltable fibers. Felt can be made from synthetic fibers.

Felt is a non-woven unbonded fibrous structure deriving coherence and strength from interfiber entanglement and accompanying frictional forces.

Felt is a non-woven unbonded fibrous structure deriving coherence and strength from interfiber entanglement and accompanying frictional forces, where the fibrous structure may include natural or synthetic fibers or a combination thereof.

Felt is a non-woven unbonded fibrous structure deriving coherence and strength from interfiber entanglement and accompanying frictional forces, where the fibrous structure may be composed entirely of natural or synthetic fibers or a combination thereof.

As to felt and felt-like products that may be employed in or as compressible layer 16, U.S. Pat. No. 4,031,283 issued Jun. 21, 1977 and entitled Polytetrafluoroethylene Felt is hereby incorporated by reference in its entirety. This patent teaches that a felt-like product or a synthetic felt or a plastic felt or a polymer felt may be or include filamentary polytetrafluoroethylene (PTFE).

As to felt and felt-like products that may be employed in or as compressible layer 16, U.S. Pat. No. 2,910,763 issued Nov. 3, 1959 and entitled Felt-Like Products is hereby incorporated by reference in its entirety. This patent teaches that a felt product may contain synthetic non-felt fibers blended with felt forming fibers and that a non-woven felt-like product may be composed wholly of synthetic filamentary material.

As to felt and felt-like products that may be employed in or as compressible layer 16, U.S. Pat. No. 8,844,158 issued Sep. 30, 2014 and entitled Super Absorber Polymer Flet and Method For The Production Thereof is hereby incorporated by reference in its entirety.

As to felt and felt-like products that may be employed in or as compressible layer 16, U.S. Pat. No. 5,160,773 issued Nov. 3, 1992 and entitled Encapsulated Felt is hereby incorporated by reference in its entirety.

A felt is a nonwoven fibrous structure. Felt and felt-like products can be made from virtually any type of fiber. Natural fibers can be blended with nonfelting synthetic fibers to produce a felt-like product. Nonwoven fibrous structures can be blended with nonfelting synthetic or nonfelting natural materials to produce a felt like product. A felt may be, and usually is, produced with no adhesives.

The gated barrier 12 of the present invention may be a gate or barrier or gated barrier disclosed in any of the following patents, all of which patents are hereby incorporated by reference in their entireties: 1) U.S. Pat. No. 8,607,502 issued Dec. 17, 2013 and entitled Gate Apparatus With Springless Automatic Return Gate, 2) U.S. Pat. No. 8,713,851 issued May 6, 2014 and entitled Gate Having Four Pins And Stairway Post Adapter, 3) U.S. Pat. No. 8,720,958 issued May 13, 2014 and entitled Barrier With Panels Sliding Parallel, 4) U.S. Pat. No. 7,887,029 issued Feb. 15, 2011 and entitled In-House Gated Safety Barrier Having Customizable Layout, 5) U.S. Pat. No. 7,950,184 issued May 31, 2011 and entitled Two-Action Gate Requiring Two Steps To Open, 6) U.S. Pat. No. 7,975,431 issued Jul. 12, 2011 and entitled Multiple Piece Gated Pressurized Barrier, 7) U.S. Pat. No. 8,196,348 issued Jun. 12, 2012 and entitled Gated Height Adjustable Barrier, 8) U.S. Pat. No. 8,261,490 issued Sep. 11, 2012 and entitled Quickly Slideable And Incrementally Adjustable Barrier, 9) U.S. Pat. No. 8,448,381 issued May 28, 2013 and entitled Small Gate Within Big Gate Within Barrier, 10) U.S. Pat. No. 9,127,496 issued Sep. 8, 2015 and entitled Expandable Barrier With Matching Panels And Corner Pet Door, 11) U.S. Pat. No. 9,260,910 issued Feb. 16, 2016 and entitled Free Standing Sliding Panel Footed Barrier, 12) U.S. Pat. No. 9,382,750 issued Jul. 5, 2016 and entitled Double Door Gate Apparatus, 13) U.S. Pat. No. 9,388,603 issued Jul. 12, 2016 and entitled Hands Free Gate, 14) U.S. Pat. No. 9,689,197 issued Jun. 27, 2017 and entitled Latch Apparatus With Independent Identical Opposing Latches, and 15) U.S. Pat. No. 9,874,055 issued Jan. 23, 2018 and entitled Apparatus Having Frame Separate From Gate.

Two layer threshold isolator 14 is shown in FIGS. 4A, 4B, and 4C. Three layer threshold isolator 14' is shown in FIGS. 5A, 5B, and 5C. Each of the threshold isolators 14 and 14' includes a bottommost compressible layer 16 with a bottommost surface, where the bottommost surface defines a plane. Preferably the bottommost compressible layer 16 of threshold isolators 14, 14' is felt or a felt-like product. The threshold isolators 14 shown in FIGS. 3A and 3B may represent threshold isolators 14 of FIGS. 4A, 4B, and 4C or threshold isolators 14' of FIGS. 5A, 5B, and 5C.

Disk shaped threshold isolator 14A of FIG. 3C may have the two layers 16, 18 of FIGS. 4A, 4B, and 4C where each of the two layers are disk shaped. Disk shaped threshold isolator 14A of FIG. 3C may have the three layers 16, 18, 20 of FIGS. 5A, 5B, 5C where each of the three layers are disk shaped. In these disk shaped threshold isolators 14A, the bottommost compressible layer 16 includes a bottommost surface, where the bottommost surface defines a plane. Preferably the bottommost compressible layer 16 of threshold isolators 14A is felt or a felt-like product.

Parallelepiped threshold isolator 14B of FIG. 3D may have the two layers 16, 18 of FIGS. 4A, 4B, and 4C where each of the two layers is parallelepiped. Parallelepiped threshold isolator 14B of FIG. 3D may have the three layers 16, 18, 20 of FIGS. 5A, 5B, 5C where each of the three layers is parallelepiped. In these parallelepiped threshold isolators 14B, the bottommost compressible layer 16 includes a bottommost surface, where the bottommost surface defines a plane. Preferably the bottommost compressible layer 16 of threshold isolators 14B is felt or a felt-like product. It should be noted that each of the threshold isolators 14, 14' shown in FIGS. 4A, 4B, 4C, 5A, 5B, and 5C is parallelepiped as a whole and that each of the layers 16, 18, 20 in FIGS. 4A, 4B, 4C, 5A, 5B, and 5C is individually parallelepiped.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A gated barrier, the gated barrier being adjacent to a floor, the gated barrier having a weight, the gated barrier comprising:

a) a barrier frame, the barrier frame being generally U-shaped, the barrier frame having an open top, the barrier frame having first and second outermost standards and a threshold between the first and second outermost standards, the threshold opposing the open top of the barrier frame;

b) a gate engaged to the barrier frame between the first and second outermost standards and above the threshold, the gate being swingable;

c) the threshold having a bottommost surface;

d) first and second isolator portions engaged to the bottommost surface of the threshold to space the bottommost surface of the threshold from the floor;

e) each of the first and second isolator portions being compressible under the weight of the gated barrier;

f) each of the first and second isolator portions comprising felt;

g) wherein the threshold includes a first end portion that extends outwardly beyond the first outermost standard;

h) wherein the threshold includes a second end portion that extends outwardly beyond the second outermost standard;

i) wherein each of the first and second isolator portions comprises an uppermost portion comprising an adhesive layer and a lowermost portion comprising a textile, wherein the lowermost portion is compressible under the weight of the gated barrier, and wherein said textile comprises said felt;

j) wherein the barrier frame includes a first end and a second end, the first end of the barrier frame including the first outermost standard, the second end of the barrier frame including the second outermost standard;

k) wherein the lowermost portion includes a bottommost surface, wherein the bottommost surface of the lowermost portion comprises said felt;

l) Wherein the first end of the barrier frame includes a first upper transverse support member and a first outermost support member, the first outermost support member extending from the threshold to the first upper transverse support member, the first outermost support member being adjacent to and outwardly of the first outermost standard, the first outermost support member engaging the threshold at a first location on an upper surface of the threshold, the first location being directly opposite of a first bottommost location on the bottommost surface of the threshold;

m) wherein the second end of the barrier frame includes a second upper transverse support member and a second outermost support member, the second outermost support member extending from the threshold to the second upper transverse support member, the second outermost support member being adjacent to and outwardly of the second outermost standard, the second outermost support member engaging the threshold at a second location on an upper surface of the threshold, the second location being directly opposite of a second bottommost location on the bottommost surface of the threshold;

n) wherein the first isolator portion is engaged to a portion of the bottommost surface of the threshold that is disposed adjacent to the first bottommost location; and o) wherein the second isolator portion is engaged to a portion of the bottommost surface of the threshold that is disposed adjacent to the second bottommost location.

* * * * *